United States Patent [19]
Spiotta et al.

[11] Patent Number: 4,926,475
[45] Date of Patent: May 15, 1990

[54] DATA ENCRYPTION KEY FAILURE MONITOR

[75] Inventors: Mark G. Spiotta, Algonquin; Erling Bjerga, Elmhurst, both of Ill.

[73] Assignee: Motorola, Inc., Schaumburg, Ill.

[21] Appl. No.: 278,097

[22] Filed: Nov. 30, 1988

[51] Int. Cl.⁵ .......................... H04K 1/00; H04L 9/02
[52] U.S. Cl. ........................................ 380/2; 380/44; 380/47
[58] Field of Search ............................ 380/2, 44, 47

[56] References Cited

U.S. PATENT DOCUMENTS 4,211,915 7/1980 Miller et al. .................... 371/15
4,229,817 10/1980 Morgan et al. .
4,281,216 7/1981 Hogg et al. .
4,465,153 8/1984 Van de Pas et al. .

*Primary Examiner*—Stephen C. Buczinksi
*Attorney, Agent, or Firm*—Joseph P. Krause; Anthony Sarli; Steve Parmellee

[57] ABSTRACT

An encryption key, required to encrypt and decrypt data according to a predefined algorithm is usually retained in a volatile memory device. Detection of loss of the key or corruption of the key is frequently possible only be means of the encryption circuit itself testing the key. Automated and repetitive testing of encryption keys by means of a processor or a control circuit periodically requesting the encryption circuit to test an encryption key minimizes data loss and system down time due to corrupted or lost keys.

10 Claims, 2 Drawing Sheets

DATA ENCRYPTION KEY FAILURE MONITOR

BACKGROUND OF THE INVENTION

This invention generally relates to digital data communication systems. Specifically, this invention relates to secure data transmission systems which encrypt data for transmission and decrypt data upon reception, thus ensuring the security of information in the data.

In a secure data system, plain or unencrypted digital data is first passed through an "encryptor" which scrambles or encrypts the data before transmission, making it unintelligible to other receivers monitoring the transmission channel. Upon reception a "decryptor" unscrambles or decrypts the information. The encryption and decryption processes performed by the encryptor and decryptor must of course be performed by methods having a common encryption code.

Most encryption algorithms require the specification of a numerical coefficient or data "key" that controls the encryption and decryption of data by the algorithm. An encryptor and decryptor must have the same "key" values to permit communication. One well-known encryption algorithm is an algorithm published by the U.S. Department of Commerce, National Bureau of Standards, as Federal Information Processing Standard, Publication 46 of Jan. 15, 1977. This encryption algorithm requires the specification of a user-defined data encryption key comprised of a 64-bit binary code. When used with this algorithm the 64-bit encryption key provides roughly seventy quadrillion possible encryption combinations ensuring a high degree of security.

To maintaining security with encrypted data communications systems, the encryption key used with encryption algorithms such as the one identified above, is typically not stored in a permanent memory location from which it might be readily copied. For greater security, the encryption key is usually stored in a volatile storage location from which the key will automatically be erased in the event of a security emergency. The volatile storage location however is also susceptible to electrical outages or electrical noise. Any inadvertent loss of the encryption key precludes intelligible transfer of secured data, and necessitates reloading the key.

One peculiarity of many encryption circuits, is the inability to detect a corrupted encryption key except by means of the encryption circuit itself performing an internal diagnostic test on the key. The encryption circuit, however, typically cannot perform the self-diagnostics during the time the system is communicating data or idle. Hence, the diagnostic test of the encryption key must be initiated by the application of a test signal on predetermined pins of the encryption chip at particular times during which the encryption circuit is not communicating. After application of the test signal, the results of the key verification test are available by evaluating a pass/fail signal which is output on another pin of the chip.

In secure communications systems having multiple channels, with each channel requiring a separate and unique encryption key, the process of initiating a key test at the correct time, verifying the integrity of each channels encryption keys, becomes a tedious and time-consuming process. Nevertheless, the undetected loss of an encryption key can result in a significant degradation of system reliability.

A need exists for an improved method and means for automatically and continuously monitoring data encryption keys, particularly in a multiple channel secure data communications system.

SUMMARY OF THE INVENTION

Accordingly, it is an object of the present invention to provide a data encryption key monitoring system which continuously checks the integrity of data encryption keys used with data encryption algorithms.

To achieve the foregoing object as well as other objects of the present invention, there is provided an apparatus to periodically and continuously test encryption keys used in an encryption algorithm. A processor or control circuit monitors encryption and decryption circuits for idle time and during this idle time requests the encryption and decryption circuits to perform tests upon encryption keys. Control lines to the encryption-decryption circuits are manipulated to initiate tests on the encryption keys by the encryption-decryption circuits. Results of the tests are provided on output pins of the circuits, readable by a controller.

Upon the detection of a corrupted encryption key, further attempts to pass data through the encryption/decryption process may be inhibited, minimizing information which might be retransmitted.

DETAILED DESCRIPTION OF THE PREFERRED EMBODIMENT

Figure 1:
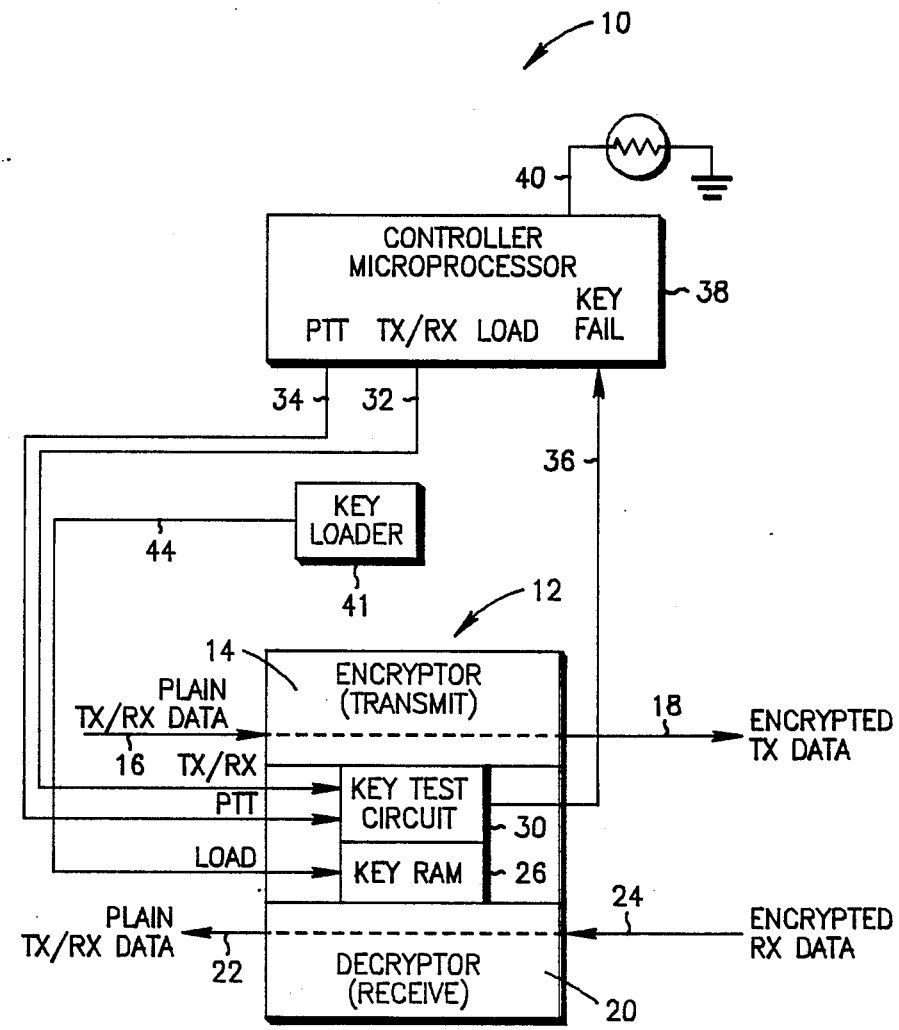
FIG. 1 is a single key secure data circuit providing a single data channel using a single encryption key.

FIG. 1 illustrates a secure data transfer circuit 10 which is essentially comprised of a single encryptor-decryptor circuit 12 and a microprocessor controller 38. Encryptor-decryptor circuit 12 receives plain, unencrypted digital data on line 16, originating from a microphone, for example. Encryptor-decryptor 12 encrypts the unencrypted data in encryptor 14 according to a predefined algorithm using a encryption key stored within key RAM 26 within encryptor-decryptor circuit 12, then, transmits the encrypted data out on line 18. Key RAM 26, referred to hereafter as RAM 26, stores the binary encryption key value.

Encrypted receive data is received by the encryptor-decryptor circuit 12 on line 24 and decrypted by the decryptor 20 of circuit 12 according to the same algorithm used in the encryption transmitter 14 and using the same key in RAM 26. Encrypted data received on line 24 is output as plain received data on line 22 for subsequent transmission to a station where it may be further processed.

Because of functional limitations of the encryptor-decryptor circuit 12, it can either transmit data or receive data in a "half-duplex" mode; it cannot transmit data and receive data simultaneously. Depending upon the states of control lines to circuit 12 the encryption and decryption circuit 12 as used in the preferred embodiment can either: (a) receive data on line 16, encrypt it and transmit it on line 18; or, (b) receive data on line 24, decrypt it, and output it on line 22.

Control lines Push-to-Talk 34 and Transmit/Receive 32 determine the operation of encryptor-decryptor circuit 12 as either receiving data or transmitting data and also determine the operation of the fail line 36. Controller 38 controls the state of push-to-talk 34 and transmit/receive 32. Using the encryptor-decryptor circuit 12 of the preferred embodiment, when Push-to-Talk 34 is logic zero and when transmit/receive 32 is logic one, encryptor-decryptor circuit 12 is receiving data on line 24 and decrypting it. When it becomes necessary to transmit data the controller 38 toggles the push-to-talk line 34 to a logic one and the transmit/receive line 32 to logic zero to switch to the transmit mode. When in this transmit mode the plain data 16 is encrypted using the encryption key in the encryption key RAM 26 and to produce the encrypted data out on line 18.

The encryption process used in circuit 12 might follow any number of encryption algorithms including the algorithm published by the National Bureau of Standards as does the encryptor-decryptor 12 of the preferred embodiment. Before being able to coherently transmit or receive data, the encryption key in the encryption key RAM 26 should be specified and loaded into the encryption key RAM 26. The encryption key RAM 26 in the preferred embodiment is a semiconductor, volatile random access memory which may be written into and read from. In addition to losing its memory contents when power is removed, these random access memories can "power up" with a random and unpredictable bit pattern.

In the circuit FIG. 1, key loader 41 generates a 64-bit binary code which is shifted into the encryption key RAM 26 of encryptor-decryptor circuit 12 by means of a load line 44. Key loader 41, autonomously generates an encryption key for the National Bureau of Standards encryption algorithm, only. Other algorithms might require other means to generate and input encryption keys. The key loader 41, loads the key value into RAM 26. Key loader 41 is controlled locally; key loader 41 is not controlled by controller 38 however, alternate embodiments contemplated by the invention would permit controller 38 to control the operation of key loader 41.

Using the encryptor-decryptor 12 of the preferred embodiment, the encryption key is kept in a volatile RAM location for greater security from which it cannot be copied. If the power to the encryptor-decryptor circuit 12 is lost, or if the circuit 12 sustains certain excessive electrical transients, an encryption key in RAM 26 may be lost or corrupted.

If the encryption key is inadvertently or intentionally lost, data cannot be encrypted. Decryption using an invalid encryption key will produce unintelligible data. In the preferred embodiment, key test circuit 30 is the only way to guarantee the integrity of the encryption key 26. Another peculiarity of the encryptor-decryptor circuit 12 used in the preferred embodiment is that key test circuit 30 tests the key in RAM 26 only when the encryptor-decryptor circuit 12 makes a transition from receive mode to transmit mode.

Shortly after the transition from receive to transmit occurs, fail line 36 will have a signal on it indicating whether the encryption key is considered valid or invalid by key test circuit 30. If the encryptor-decryptor circuit 12 does not make a transition between the receive and transmit states, no test of the key is performed. If a key test is performed, the results of the test stay on fail line 26 until the test is run again at which time the key fail line is updated.

To initiate a test of the encryption key, the controller must force the circuit 12 to make the transition from receive to transmit. To avoid losing data being processed by circuit 12, the transition from receive to transmit for purposes of testing a key should only be forced during times when the encryptor-decryptor circuit 12 is idle. When the circuit its receiving, a transition to transmit necessitates shutting off the receiver, thereby losing any data it may be processing. Similarly, if data is being transmitted, the transmitter must be shut off, the receiver switched on momentarily then the transmitter re-enabled, also causing data to be lost.

When multiple encryptor-decryptor circuits 12 are used in a communications system, each encryption key must be verified by the processor forming a transition from receive to transmit. Each circuit is forced to initiate the self-test of the encryption key in RAM 26 by appropriately controlling the lines Push-to-Talk 34 and Transmit/Receive 32.

Figure 2:
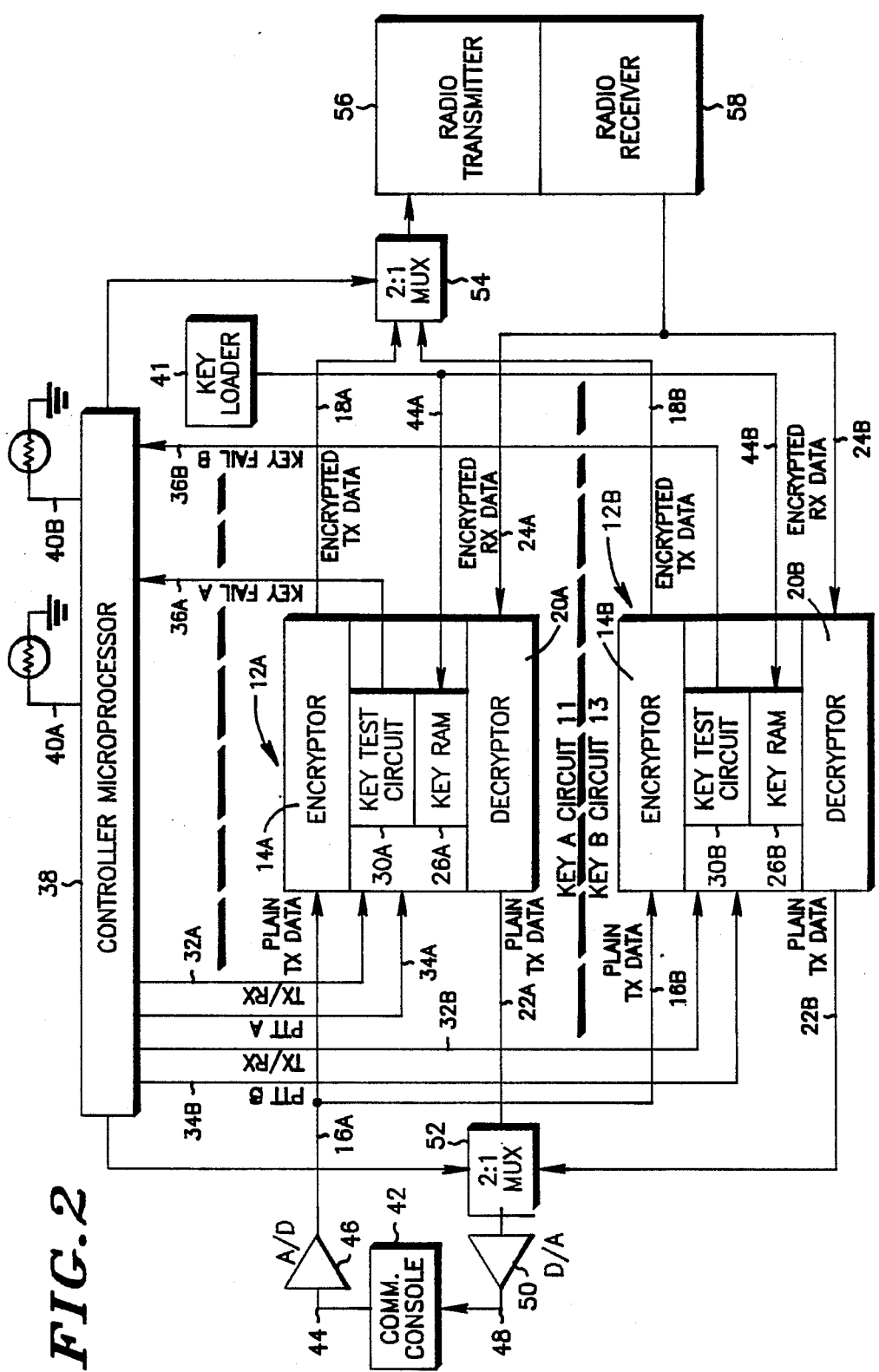
FIG. 2 shows a two-key secure data circuit providing two secure data channels to a source of information.

Referring now to FIG. 2 there is shown a two-key, multiple channel version of the system shown in FIG. 1. Two encryptor-decryptor circuits, 12A and 12B each contain and use an encryption key. Both the upper circuit, designated key A circuit 11, and the lower circuit, designated key B circuit 13, receive from console 42, information converted from analog to digital format by A/D converter 46. The plain data from the console, after being converted to a digital form is encrypted in both encryptor 14A and encryptor 14B. By the two-to-one multiplexor 54, the controller 38 selects from which encryptor, data is to be sent.

Similarly, incoming encrypted data from radio receiver 58 is decrypted in both decryptor 20A and decryptor 20B. Plain data on lines 22A and 22B is selected for transfer to the communications console 42 by means of controller 38 selecting which key circuit A or B to accept data from, by means of two-to-one multiplexor 52. Decrypted digital data from multiplexor 52 is converted to an analog form by digital-to-analog converter 50. Multiplexors 52 and 54 are digital multiplexors which selectively connect at least one of multiple inputs to at least one output as those skilled in the art will recognize.

If the key in either encryptor-decryptor circuit 12A or 12B is invalid of if it is desirable to use another encryption circuit, the controller 38 has to merely select which signals into multiplexors 52 and 54 to enable to their respective outputs. By means of the multiplexors 52 and 54, either key A or key B circuits can be selected for processing data.

Using multiple encryption circuits permits either different encryption keys to be used for different communications purposes for example, or, permits more reliable communications if both circuits use the same key with one circuit acting as a redundant circuit. Large numbers of encryption circuits, which are common in many secure data systems, increases the overhead associated with detecting multiple invalid keys.

As shown, the integrity of the encryption keys in RAM's 26A and 26B is automatically verified by processor 38. Processor 38 effects state transitions on control lines 32A, 32B, 34A and 34B, connected to circuits 12A and 12B to test the encryption keys. Processor 38 also conducts surveys of fail lines to identify failed keys. In testing multiple encryption keys,. processor 38 may continuously or repetitively test encryption keys as needed. As each test is executed, processor 38 can ascertain the integrity of encryption keys be examining the fail lines 26A and 26B.

In the preferred embodiment, control lines 32A and 32B, 34A and 34B, and 36A and 36B, are peripheral input/output lines of controller 38. Depending upon the number of separate input-output ports available from controller 38, masking individual bits of these input-/output lines using well-known techniques might be required to permit the individual strobing of lines 32A and 32B and 34A and 34B and the individual testing of bits in lines 36A and 36B. If controller has a sufficient number of input output ports such that a separate port is available for each control line, bit masking might not be required.

In the preferred embodiment, the encryptor-decryptor circuit 12 as shown in FIGS. 1 and 2 is a Motorola 5183977M22, part of a Motorola thick film hybrid, TRN7036A. The encryptor-decryptor circuit 12 performs the calculation required for the above identified National Bureau of Standards encryption algorithm. The key loader 41 of the preferred embodiment is also a Motorola product which generates a 64 bit binary value required by the encryption engine. The key loader is a companion part, Motorola Part number T3011AX.

Any suitable microprocessor, microcontroller or other computer might serve the function of controller 38 as shown in FIGS. 1 and 2. The function of controller 38 could also be performed by hard-wired logic circuits as those skilled in the art will readily recognize.

Using the above invention multiple encryption and decryption circuits having volatile encryption keys are automatically and continuously verified. Data lost by invalid encryption keys is minimized. As an added feature, an external indication device such as a lamp or LED or other alarm device under the control of controller 38 could be implemented alerting the operator of the secure data system that an encryption key is lost. Other functions of controller 38 could include the inhibition of further transmission to data channels which suffer from invalid encryption keys.

In review, it can be seen that the present invention provides an improved method and apparatus for monitoring volatile encryption keys. Data loss is minimized and secure data transmission is maximized by repetitive and continuous testing of encryption keys used with encryption circuits.

While a specific embodiment of the invention has been shown and described herein, further modifications and improvements may be made by those skilled in the art. Modifications which retain the basic underlying principles disclosed and claimed herein are within the scope of this invention.

What is claimed is:

1. An encryption key monitoring system for periodically testing an encryption key of at least one of a plurality of encryption circuit means, each of said encryption circuit means generating encrypted data from plain data using an encryption key, said system comprised of:
   a plurality of encryption circuit means for generating encryption signals from unencrypted data signals, each of said encryption circuit means being comprised of:
      volatile memory means for storing an encryption key;
      encryption key testing means for determining when said encryption key is invalid in response to a test signal applied to a first input thereby producing a fail signal at a first output when said encryption key is invalid, said volatile memory means and said encryption key testing means being integral components of said encryption circuit means; and
   control means for periodically generating said test signal, said control means generating said test signal during inactive periods of said encryption circuit means and, for detecting said fail signals and for providing an indication of which of said plurality of encryption circuit means has an invalid encryption key.

2. The system of claim 1, further comprising means for transmitting a predetermined encrypted data signal from said plurality of communications circuits.

3. The system of claim 2, wherein said means for transmitting a predetermined encrypted data signal is a digital multiplexor.

4. The system of claim 1, wherein said control means includes means for detecting when said communications circuits are not generating encrypted data.

5. The system of claim 1, further comprising means for loading an encryption key into said means for storing an encryption key.

6. The system of claim 1, further comprising means for loading an encryption key into said means for storing an encryption key, said means for loading an encryption key being coupled and responsive to said control means.

7. The system of claim 1 where said control means is a computer.

8. A method of monitoring at least one encryption key in a plurality of data encryption and decryption circuits which encrypt and decrypt data, each encryption and decryption circuit having a volatile encryption key, a test circuit for testing said encryption key in response to an external signal and providing to an output an indication of failed keys as detected by said test circuit said method comprised of:
   monitoring said plurality of data encryption and decryption circuits to determine when said circuits are not encrypting or decrypting data;
   providing to at least one encryption circuit of said plurality of encryption and decryption circuits, said external signal causing said test circuit to test said encryption key when said at least one encryption circuit is not encrypting or decrypting data;
   detecting said indication of failed keys in said at least one encryption circuit; and
   providing an external indication of encryption key failures.

9. A communication channel for transferring encrypted data between at least first and second communication devices and periodically monitoring encryption keys require to encrypt said data, said communications channel comprised of:
   first communications means for sending encrypted data;
   second communications means for receiving encrypted data;
   first circuit means for receiving unencrypted data from said first communications means and transmitting corresponding encrypted data to said second communications means, said first circuit means having:
      means for storing an encryption key,
      means for testing an encryption key in said storage means in response to a test signal at a first input and producing a fail signal at a first output when said encryption key is invalid.
   said first circuit means having a busy state during which unencrypted data from said first communications means is encrypted and transmitted to said second communications means, and an idle state during which no data encryption occurs, said means for testing an encryption key in said storage means testing said encryption key after said first circuit means makes a transition from said idle state to said busy state;

first control means coupled to said first input of said first circuit means for periodically generating said test signal and for detecting said fail signals and for providing an indication of a failed encryption key, said first control means generating said test signal when said first circuit means is not receiving unencrypted data from said first communications means.

10. The communications channel of claim 9, wherein said means for storing an encryption key is a volatile random access memory.

* * * * *